Nov. 20, 1923.
E. A. MULLER
1,474,438
TURRET HEAD FOR MACHINE TOOLS
Filed Jan. 6, 1922     2 Sheets-Sheet 1
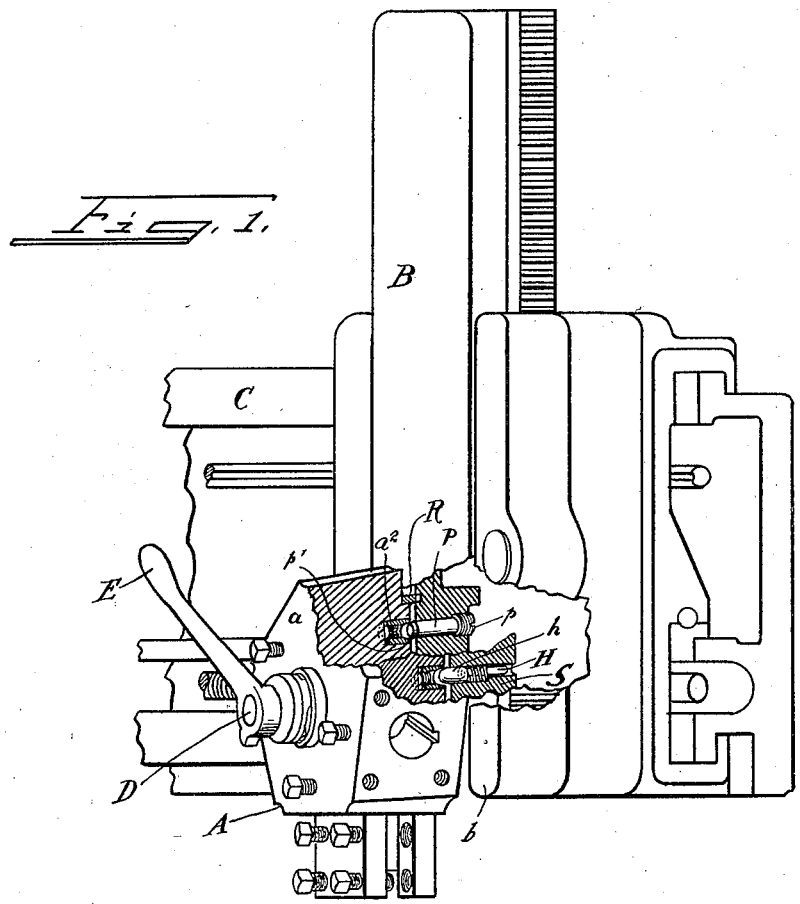
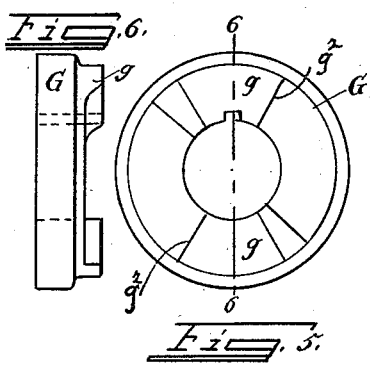
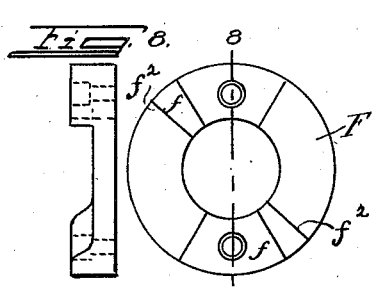
INVENTOR:
Edward A. Muller
BY Walter A. Knight
ATTORNEY.

Nov. 20, 1923.

E. A. MULLER 1,474,438

TURRET HEAD FOR MACHINE TOOLS

Filed Jan. 6, 1922    2 Sheets-Sheet 2

INVENTOR:
Edward A. Muller
BY Walter A. Knight
ATTORNEYS.

Patented Nov. 20, 1923.

1,474,438

UNITED STATES PATENT OFFICE.

EDWARD A. MULLER, OF CINCINNATI, OHIO, ASSIGNOR TO THE KING MACHINE TOOL COMPANY, OF CINCINNATI, OHIO, A CORPORATION OF OHIO.

TURRET HEAD FOR MACHINE TOOLS.

Application filed January 6, 1922. Serial No. 527,317.

*To all whom it may concern:*

Be it known that I, EDWARD A. MULLER, a citizen of the United States, residing at Cincinnati, in the county of Hamilton and State of Ohio, have invented new and useful Improvements in Turret Heads for Machine Tools, of which the following is a specification.

My invention relates to turret-heads for machine tools and particularly to means for revolving them, setting them in the desired position and clamping them in position when set.

The principal object of the invention is to provide very simple and easily operated mechanism for revolving and clamping the head and for ensuring its indexing at each of the angular positions at which the head is set for work.

In the particular embodiment of my invention selected for illustration:—

Figure 1 is a perspective view of my turret-head and attendant parts of the machine tool as used on a boring-mill, with parts broken away and in section to show indexing and feeler pins. The head is shown in this figure in released position;

Figure 2:
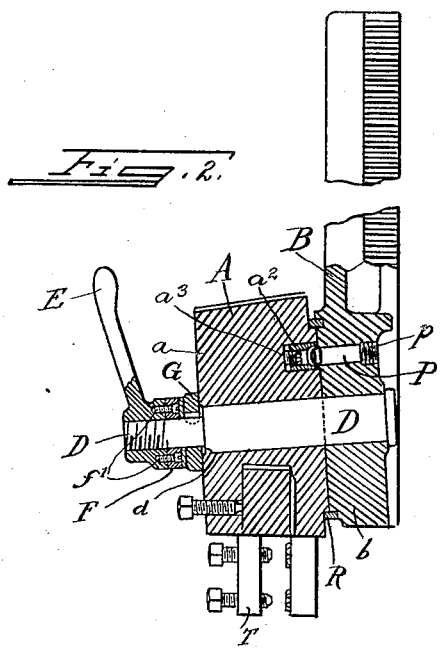
Figure 2 is a vertical, axial section of the turret-head clamped in position for work on the turret-slide.
Figure 3:
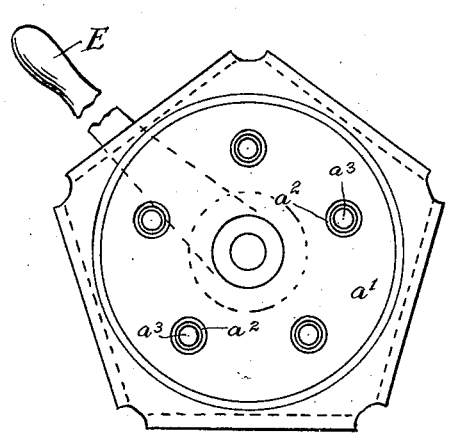
Fig. 3 is a rear elevation of the turret.
Figure 4:
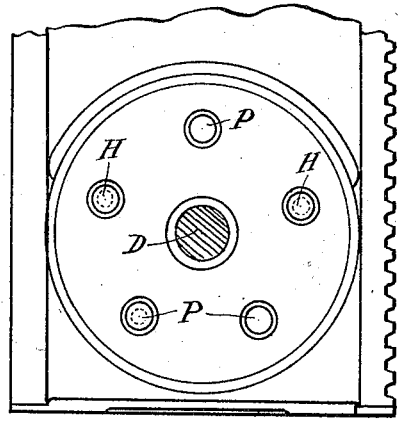
Fig. 4 is a front elevation of the turret-slide with the turret off and the stud in section.

Fig. 5 a detail, is an elevation of the cam collar that seats on the stud;

Fig. 6 a detail, is an elevation of the same.

Fig. 7 a detail, is an elevation of the cam collar that seats on the clamping handle; and Fig. 8 a detail, is an axial section thru the same on the line 8—8 of Fig. 7.

Referring now to the drawings: A is a turret-head mounted on the lower end $b$ of a turret slide B. The surface against which the head seats is preferably beveled so as to incline the head slightly downwardly, shown in the drawings about 5° from vertical. This inclination causes the head to tend to go to outward or released position as soon as unclamped. The turret-slide is otherwise of the usual type and is secured to and horizontally movable upon the cross-rail C in the usual way.

A stud D is secured to or thru the end $b$ of the slide B and is provided with a shoulder $d$ just below the outer face $a$ of the head A. A clamping handle E is threaded on to the outer end of the stud D.

Keyed by the key $g^1$ to the stud towards its outer end or otherwise secured against rotation, is a cam-collar G with cams $g$ on its outer surface and shoulders $g^2$. Fixed by screws $f^1$ or otherwise to the inner surface of the stud end of the clamping handle E, is a cam-collar F with cams $f$ on its exposed surface and shoulders $f^2$, adapted to contact with the shoulders $g^2$ at the limit of clamping rotation. The cams $g$ and $f$ co-act, and are of such size as to, together with the thread on the clamping handle and stud, completely clamp the turret-head to the turret-slide or release the same therefrom by a one-fourth rotation of the handle E.

A dust ring R is adapted to cover the contiguous edges of the turret-head and turret-slide, so as to keep out foreign matter which would otherwise enter when the head was in released position and interfere with the proper operation of the device.

A plurality of index pins P are fitted thru the end $b$ of the slide B with their tapered ends $p^1$ protruding therefrom on the head side, and are adjustable from the rear of the slide by means of screws $p$.

A plurality of feeler pins H are seated in the end $b$ of the slide B have semi-spherical or otherwise rounded protruding ends $h$ and are constantly pressed outwardly toward the head A by springs S.

Adapted to receive any of these pins P and H, are tapered seats on the inner side $a^1$ of the turret-head. These are preferably formed in a bushing $a^2$ adjustable by means of screws $a^3$.

The pressure of the springs S together with the downward inclination of the stud D cause the turret-head to stay in outward or released position; so that release for change of position is instantaneous and requires no separate manual effort.

The pins P and H must all be spaced with radial and angular exactness.

The tool clamping means T are of any usual type.

Obviously many changes may be made without departing from the spirit of my invention; and any structure readable upon the claims hereof is within the scope of my invention.

I claim as my invention and desire to secure by Letters Patent of the United States:—

1. The combination of a slide adapted to support a turret-head, a stud fixed to said slide, a turret-head adapted to be rotated on said stud when said head is in released position, a handle threaded to the stud for clamping the head to the slide, an index pin seated in one of said members to be so clamped, and protruding from the clamping face thereof, a feeler-pin seated in and protruded from the same clamping face as the index pin by a spring, said spring, and a plurality of seats in the clamping face of the other member adapted to receive either said index-pin or said feeler-pin, said pins and seats so arranged as to either indicate or fix the position of the head in relation to the slide at each working position of the head.

2. The combination of a slide adapted to support a turret-head, a stud fixed to said slide, a turret-head adapted to be rotated on said stud when said head is in released position, a handle threaded to the stud for clamping the head to the slide, a taper-faced index pin seated in one of said members to be so clamped and protruding from the clamping face thereof, means for axially adjusting the position of said index-pin, a semi-spherically faced feeler-pin seated in and protruded from the same clamping face as the index pin by a spring, said spring and a plurality of taper seats in the clamping face of the other member adapted to receive either said index-pin or said feeler-pin, said pins and seats so arranged as to either indicate or fix the position of the head in relation to the slide at each working position of the head.

3. The combination of a slide adapted to support a turret-head, a stud fixed to said slide in a position slightly inclined downwardly, a turret-head adapted to be rotated on said stud when said head is in released position, a handle threaded to the stud for clamping the head to the slide, an index pin seated in one of said members to be so clamped, and protruding from the clamping face thereof, a feeler-pin seated in and protruded from the same clamping face as the index pin by a spring, said spring and a plurality of taper seats in the clamping face of the other member adapted to receive either said index-pin or said feeler-pin, said pins and seats so arranged as to either indicate or fix the position of the head in relation to the slide at each working position of the head.

4. The combination of a slide adapted to support a turret-head, a stud fixed to said slide in a position slightly inclined downwardly, the plane of the clamping surface of said slide being at right angles to the axis of said stud, a turret-head adapted to be rotated on said stud when said head is in released position, a handle threaded to the stud for clamping the head to the slide, a taper-faced index pin seated in one of said members to be so clamped and protruding from the clamping face thereof, means for axially adjusting the position of said index-pin, a semi-spherically faced feeler-pin seated in and protruded from the same clamping face as the index pin by a spring, said spring, a plurality of taper seats in the clamping face of the other member adapted to receive either said index-pin or said feeler-pin, and means for axially adjusting the position of each of said seats, said pins and seats so arranged as to either indicate or fix the position of the head in relation to the slide at each working position of the head.

5. The combination of a slide adapted to support a turret-head, a stud fixed to said slide, a turret-head adapted to be rotated on said stud when head is in released position, a handle threaded to the stud for clamping the head to the slide, a taper-faced index pin seated in one of said members to be so clamped and protruding from the clamping face thereof, a rounded faced feeler-pin seated in and protruded from the same clamping face as the index pin by a spring, said spring, a plurality of taper seats in the clamping face of the other member adapted to receive either said index-pin or said feeler-pin, said pins and seats so arranged as to either indicate or fix the position of the head in relation to the slide at each working position of the head, and a cam between the contiguous surfaces of the handle and head for accelerating the clamping and releasing movement.

6. The combination of a slide adapted to support a turret-head, a stud fixed to said slide in a position slightly inclined downwardly, a turret-head adapted to be rotated on said stud when said head is in released position, a handle threaded to the stud for clamping the head to the slide, a taper-faced index pin seated in one of said members to be so clamped and protruding from the clamping face thereof, means for axially adjusting the position of said index-pin, a semi-spherically faced feeler-pin seated in and protruded from the same clamping face as the index pin by a spring, said spring, a plurality of taper seats in the clamping face of the other member adapted to receive either said index-pin or said feeler-pin, means for axially adjusting the position of each of said seats, said pins and seats so arranged as to either indicate or fix the position of the head in relation to the slide at each working position of the head, and a cam between the contiguous surfaces of the handle and head for accelerating the clamping and releasing movement.

7. The combination of a slide adapted to support a turret-head, a stud fixed to said slide in a position slightly inclined downwardly, the plane of the clamping surface of said slide being at right angles to the axis of said stud, a turret-head adapted to be rotated on said stud when said head is in released position, a handle threaded to the stud for clamping the head to the slide, a plurality of taper-faced index pins seated in one of said members to be so clamped and protruding from the clamping face thereof, means for axially adjusting the position of said index-pin, a plurality of rounded faced feeler-pins seated in and protruded from the same clamping face as the index-pin by springs, said springs, a plurality of taper seats in the clamping face of the other member adapted to receive either said index-pins or said feeler-pins, means for axially adjusting the position of each of said seats, said pins and seats so arranged as to either indicate or fix the position of the head in relation to the slide at each working position of the head, and a cam between the contiguous surfaces of the handle and head for accelerating the clamping and releasing movement.

8. The combination of a slide adapted to support a turret-head, a stud fixed to said slide in a position slightly inclined downwardly, the plane of the clamping surface of said slide being at right angles to the axis of said stud, a turret-head adapted to be rotated on said stud when said head is in released position, a plurality of taper-faced index pins seated in the slide and protruding from the clamping face thereof, means for axially adjusting the position of said index-pin, a plurality of rounded faced feeler-pins seated in the slide and protruded from the clamping face thereof by springs, said springs, a plurality of taper seats in the clamping face of the head adapted to receive either said index-pins or said feeler-pins, means for axially adjusting the position of each of said seats, said pins and seats so arranged as to either indicate or fix the position of the head in relation to the slide at each working position of the head, a handle threaded onto the stud for clamping the head to the slide, and a cam between the contiguous surfaces of the handle and head for accelerating the clamping and releasing movement.

In testimony whereof I have hereunto set my hand in presence of two subscribing witnesses.

EDWARD A. MULLER.

Witnesses:
 NORMA D. BERGER,
 CARL PHARES.